United States Patent
Manders et al.

(10) Patent No.: US 8,894,137 B2
(45) Date of Patent: Nov. 25, 2014

(54) OPEN ROOF CONSTRUCTION FOR A VEHICLE

(71) Applicant: Inalfa Roof Systems Group B.V., Venray (NL)

(72) Inventors: Peter Christiaan Leonardus Johannes Manders, Horst (NL); Marcel Johan Christiaan Nellen, Merselo (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 13/714,876

(22) Filed: Dec. 14, 2012

(65) Prior Publication Data

US 2014/0008941 A1    Jan. 9, 2014

(30) Foreign Application Priority Data

Dec. 19, 2011    (EP) .................................. 11194269

(51) Int. Cl.
  *B60J 7/057*    (2006.01)
  *B60J 7/04*    (2006.01)
  *B60J 7/047*    (2006.01)

(52) U.S. Cl.
  CPC ... *B60J 7/047* (2013.01); *B60J 7/04* (2013.01)
  USPC .................. 296/223; 296/220.01; 296/216.03

(58) Field of Classification Search
  CPC ...................................... B60J 7/02; B60J 7/05
  USPC ............................................. 296/216.01–224
  See application file for complete search history.

(56) References Cited

U.S. PATENT DOCUMENTS

| | | | |
|---|---|---|---|
| 4,995,667 | A | 2/1991 | Tamura et al. |
| 6,916,064 | B2 | 7/2005 | Bohm et al. |
| 2006/0080903 | A1 | 4/2006 | Grimm |
| 2011/0254323 | A1 | 10/2011 | Nellen |

FOREIGN PATENT DOCUMENTS

| | | |
|---|---|---|
| DE | 10143823 | 3/2003 |
| DE | 10201636 | 8/2003 |
| DE | 102009025331 | 12/2010 |
| EP | 1650068 | 4/2006 |
| EP | 2380763 | 10/2011 |
| WO | WO 2009152789 | 12/2009 |

OTHER PUBLICATIONS

European Search Report of the European Patent Office Patent Office in counterpart foreign application No. 11194269.4 filed Dec. 19, 2011, dated May 29, 2012.

(Continued)

*Primary Examiner* — Dennis H Pedder
(74) *Attorney, Agent, or Firm* — Steven M. Koehler; Westman, Champlin & Koehler, P.A.

(57) ABSTRACT

Open roof construction for a vehicle having a roof assembly with a panel and a mechanism for closing and opening a roof opening. The moving mechanism comprises two stationary guides extending at least partly in a non-parallel manner along opposite longitudinal edges of the roof opening and two pivot arms each having a first end movably attached to the panel and a second end connected to one of the stationary guides. Each pivot arm is provided with at least one guide member, whereas the movable panel comprises at least two guide parts along which the guide members will move when the respective pivot arms pivot around a respective pivot axis. The shape of said guide parts is such that as a result of the cooperation between corresponding guide members and guide parts the movable panel may be moved in a vertical and/or horizontal direction.

20 Claims, 12 Drawing Sheets (56) References Cited

OTHER PUBLICATIONS

European Search Report of the European Patent Office Patent Office in foreign application No. 10160457.7 filed Apr. 2010, dated Jun. 15, 2010.

Office Action for U.S. Appl. No. 13/088,785, filed Apr. 18, 2011, mailed Apr. 9, 2012, pp. 1-7.

Final Office Action for U.S. Appl. No. 13/088,785, filed Apr. 18, 2011, mailed Aug. 17, 2012, pp. 1-6.

Advisory Action for U.S. Appl. No. 13/088,785, filed Apr. 18, 2011, mailed Dec. 27, 2012, pp. 1-3.

OPEN ROOF CONSTRUCTION FOR A VEHICLE

BACKGROUND

The discussion below is merely provided for general background information and is not intended to be used as an aid in determining the scope of the claimed subject matter.

A type of open roof construction for a vehicle, includes a stationary roof part, a roof opening provided therein, a panel which is movable between closed and open positions for closing and opening. A moving mechanism includes two stationary guides extending at least partly in a non parallel manner along opposite longitudinal edges of the roof and two pivot arms which each operate between a respective one of the stationary guides and the movable panel. Each pivot arm at a first end, is movably attached to the movable panel with a substantially vertically extending pivot axis and at an opposite second end of the pivot arm, is guided by said respective one of the stationary guides. Each pivot arm in the region of its second end is provided with at least one guide member, whereas the movable panel comprises at least two guide parts along which the respective guide members will move when the respective pivot arms, as a result of the cooperation between the stationary guides and said pivot arms, pivot around a respective pivot axis.

Such an open roof construction is known from EP-A-2 380 763 in the name of applicant. According to this state of the art, the use of non parallel stationary guides makes it possible to design the open roof construction in accordance with the (transverse) curvature of the roof of the vehicle. The pivot arms provide a compensation for the varying distance between the stationary guides, such that, notwithstanding the curved shape of the stationary guides, basically the use of standard constructional means remains possible.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

It is first noted that indications as vertical, horizontal and longitudinal in the present specification refer to the normal orientation of the vehicle.

In accordance with an aspect of the present invention, an open roof construction includes a shape of said guide parts such that as a result of the cooperation between corresponding guide members and guide parts, the movable panel may be moved in a vertical and/or horizontal direction.

The cooperation between the guide members and guide parts not only is used to provide a compensation for the varying distance between the stationary guides, but also is used for causing an additional movement of the movable panel in a vertical and/or horizontal direction. This allows the movable panel to have more complicated movements without substantially complicating the construction (for example the number of parts may substantially remain the same). For example a vertical movement may be caused which is used for lifting or lowering the movable panel or part of the moveable panel.

In one embodiment, the guide parts, as seen in a top plan view, are shaped to define a movement of the guide members along a circle segment. If, in such an event, the center of the circle segment further coincides with the pivot axis, the movable panel will not move in a horizontal direction when the pivot arms rotate around the pivot axis, such that only a vertical movement will be caused.

In an alternative embodiment of the open roof construction the guide parts, as seen in a top plan view, are shaped to define a movement of the guide members along a substantially straight line. In such a case pivoting the pivot arms around the pivot axis also will cause a horizontal movement of the panel (generally, but not exclusively, in a longitudinal direction). Such a horizontal movement may or may not be accompanied by a vertical movement of the panel.

It is conceivable that the guide parts also define other movements of the guide members, e.g. along curved lines not defining circle segments such as but not limited to arcuate, portion of an ellipse, portion of a parabola etc.

In another embodiment of the open roof construction cooperating parts of each pivot arm and corresponding pivot axis are shaped such that a relative rotation there between also causes a relative vertical movement there between. As a result pivoting of the pivot arm also will result in a vertical movement of the movable panel at the pivot axis.

For achieving such a movement it is possible that the pivot arm and pivot axis comprise cooperating curved surfaces. For example the pivot arm and pivot axis may comprise cylindrical parts with facing and cooperating frontal ends, wherein said curved surfaces are defined on said frontal ends. Said curved surfaces provide differently inclined parts which cooperate with each other.

In other embodiments of the open roof construction, the guide parts are attached to the movable panel in an adjustable manner, preferably adjustable in a longitudinal and/or vertical direction. This allows an adjustment, for example to cope with production tolerances or wear.

In a specific embodiment said adjustable attachment comprises oversized holes in the guide parts and/or movable panel for receiving attachment means, such as for example screws. After loosening the screws an adjustment may occur by sliding the screws to a new position within the holes, after which the screws may be tightened again.

Further it is possible that the pivot axis is connected to the movable panel in an adjustable manner. This offers a further possibility for achieving an adjustment (in which case the adjustable connection between the pivot axis and movable panel might be lockable), but it also may offer the possibility to allow the pivot axis to move along the movable panel for offering an additional movement to the panel.

For example, the pivot axis is provided on a secondary guide member which is guided by, and for movement along, a secondary guide part attached to the movable panel.

In yet another embodiment of the open roof construction cooperating parts of the guide members and guide parts are shaped in a manner to allow different angular dispositions between a guide member and respective guide part. For example said cooperating parts may comprise curved surfaces. This may prevent a jamming between the guide members and guide parts.

For obtaining the desired vertical movement of the movable panel, it is possible that each guide part defines a guide way below the movable panel determining the movement of the corresponding guide member, which guide way has two opposite ends of which one end is located closer to the movable panel than the other end. When the guide member moves from the end closer to the panel towards the end further away from the panel, the panel will move upward. When the guide member moves from the end further away from the panel towards the end closer to the panel, the panel will move downward.

It is possible that in one embodiment the guide way extends substantially with a constant inclination. This leads to a vertical movement of the panel with substantially constant velocity.

However, in yet another embodiment the guide way may extend with a varying inclination. For example, the inclination of the guide way in the vicinity of its opposite ends may be smaller than in a central region between the opposite ends, such that at the start and end of the vertical movement of the panel its vertical velocity is low and in between its vertical velocity is higher, achieving a smooth transition between stand still and movement and vice versa without causing extreme accelerations of the panel(and thus forces acting thereon).

BRIEF DESCRIPTION OF THE DRAWINGS

Hereinafter aspects of the invention will be elucidated while referring to the drawings, in which.

DETAILED DESCRIPTION OF THE ILLUSTRATIVE EMBODIMENTS

Figure 1:
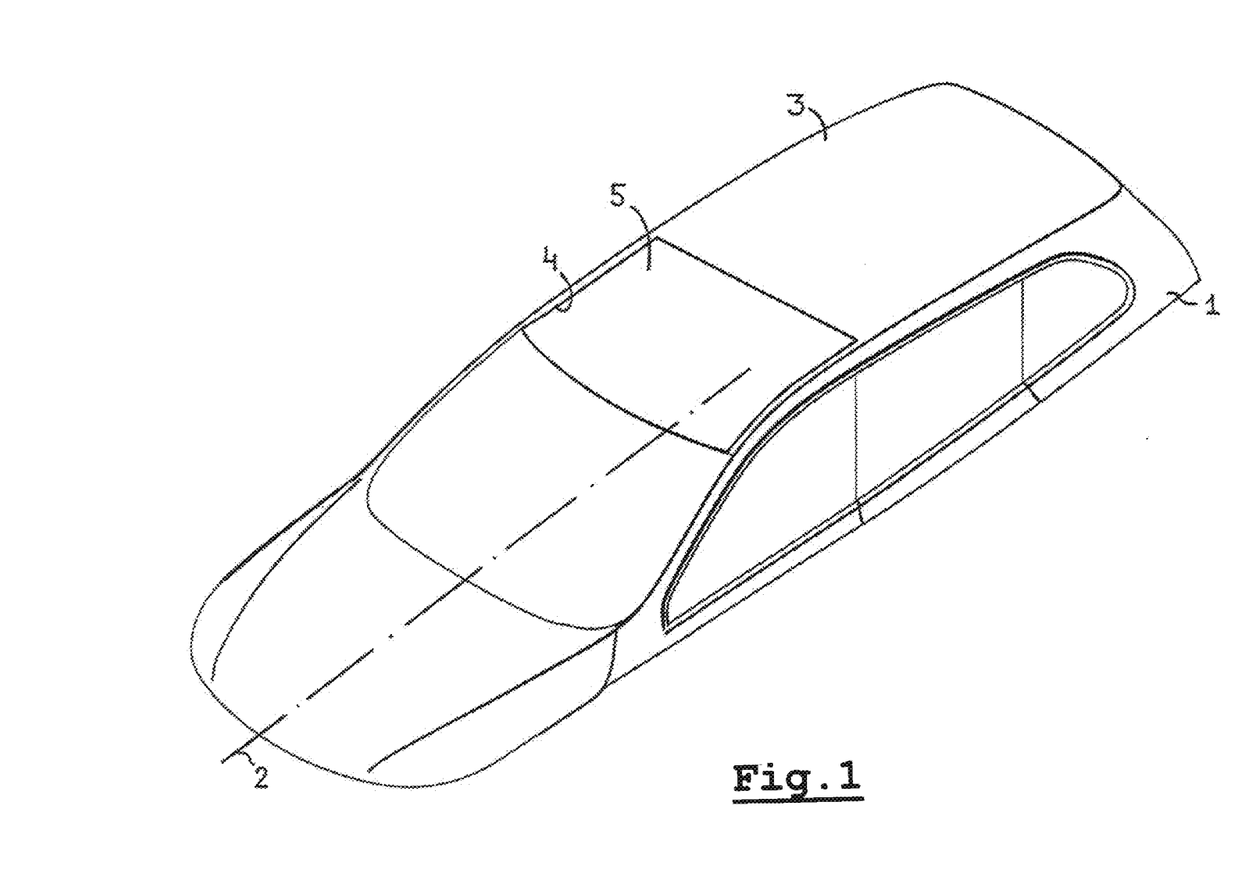
FIG. 1 shows in perspective view a top part of a vehicle.

Referring firstly to FIG. 1 an upper part of a vehicle 1 is illustrated having a central axis 2 defining a longitudinal axis. The vehicle comprises a stationary roof part 3, a roof opening 4 provided therein, and roof assembly having a panel 5 which is movable between closed and open positions for closing and opening, respectively, said roof opening 4. As is known per se (and has not been illustrated in detail) a moving mechanism will be provided for connecting the movable panel 5 to the stationary roof 3 and moving it with respect thereto.

Figure 2:
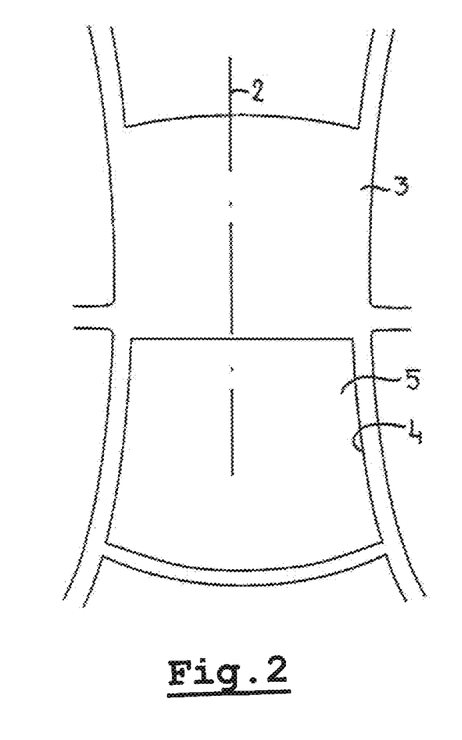
FIGS. 2 and 3 show differently shaped roofs of a vehicle.
Figure 3:
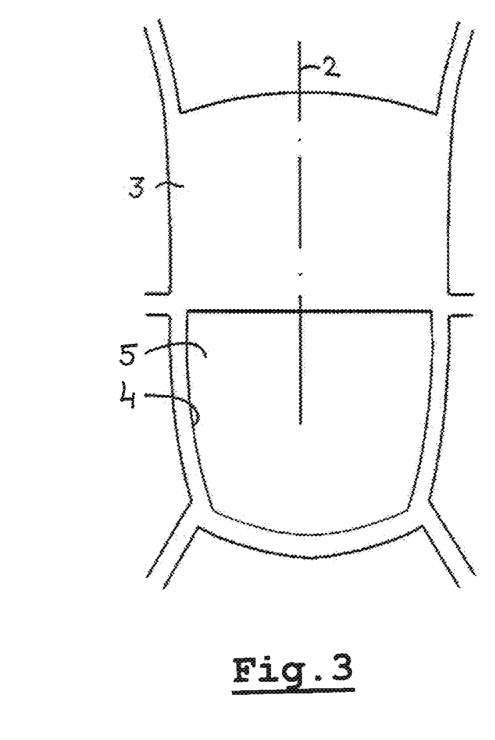

In many modern vehicles the roof (as seen in a top plan view) has curved outer contours. FIGS. 2 and 3 show two possible contours. As a result, when optimising the roof opening 4 in such vehicles, said roof opening 4 (and consequently the movable panel 5) also will have curved outer contours.

For coping with such curved contours a moving mechanism at least comprises two stationary guides 6 (indicated in FIGS. 4 and 5) extending at least partly in a non parallel manner along opposite longitudinal edges of the roof opening 4 (and in the shown embodiment also partly in the roof part behind the roof opening) such that, as seen in a top plan view of the vehicle, the distance between the stationary guides 6 varies at different lengthwise (or longitudinal) positions of the vehicle 1.

Figure 4:
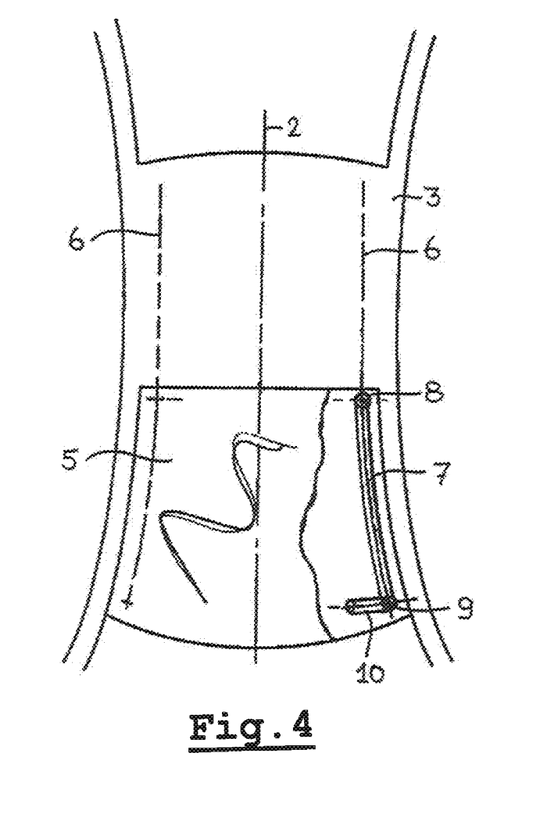
FIGS. 4 and 5 illustrate the basic operation of the open roof construction.
Figure 5:
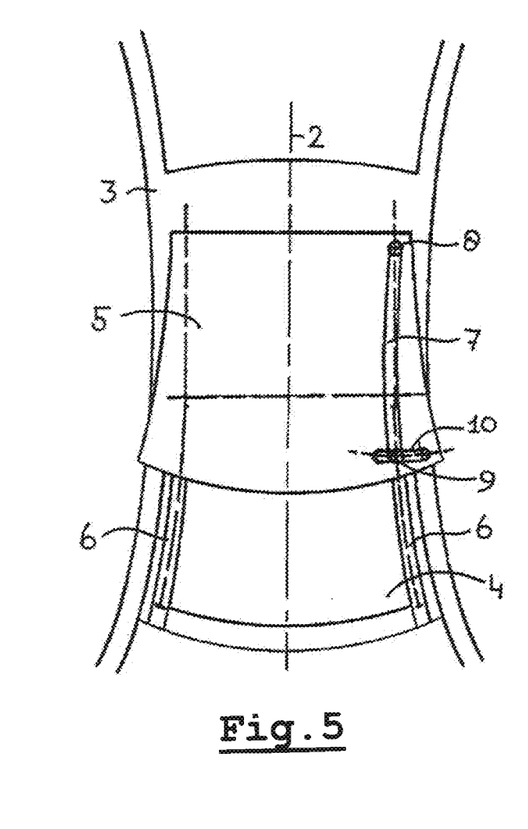

The moving mechanism further comprises two pivot arms 7 (only one has been illustrated; the other is located at a corresponding opposite side of the roof opening 4 or movable panel 5) which each operate between a respective one of the stationary guides 6 and the movable panel 5. Each pivot arm 7, at a first end, is movably attached to the movable panel 5 with a substantially vertically extending pivot axis 8. Closer to an opposite second end the pivot arm 7, by a guide shoe or similar means to be illustrated later, is guided by said respective one of the stationary guides 6. Finally each pivot arm 7 in the region of its second end is provided with at least one guide member 9, whereas the movable panel 5 comprises at least two guide parts 10 (only one illustrated; the other is located at a corresponding opposite side of the movable panel 5) along which the respective guide members 9 will move when the respective pivot arms 7, as a result of the cooperation between the stationary guides 6 and said pivot arms, pivot around the respective pivot axes 8.

Figure 6:
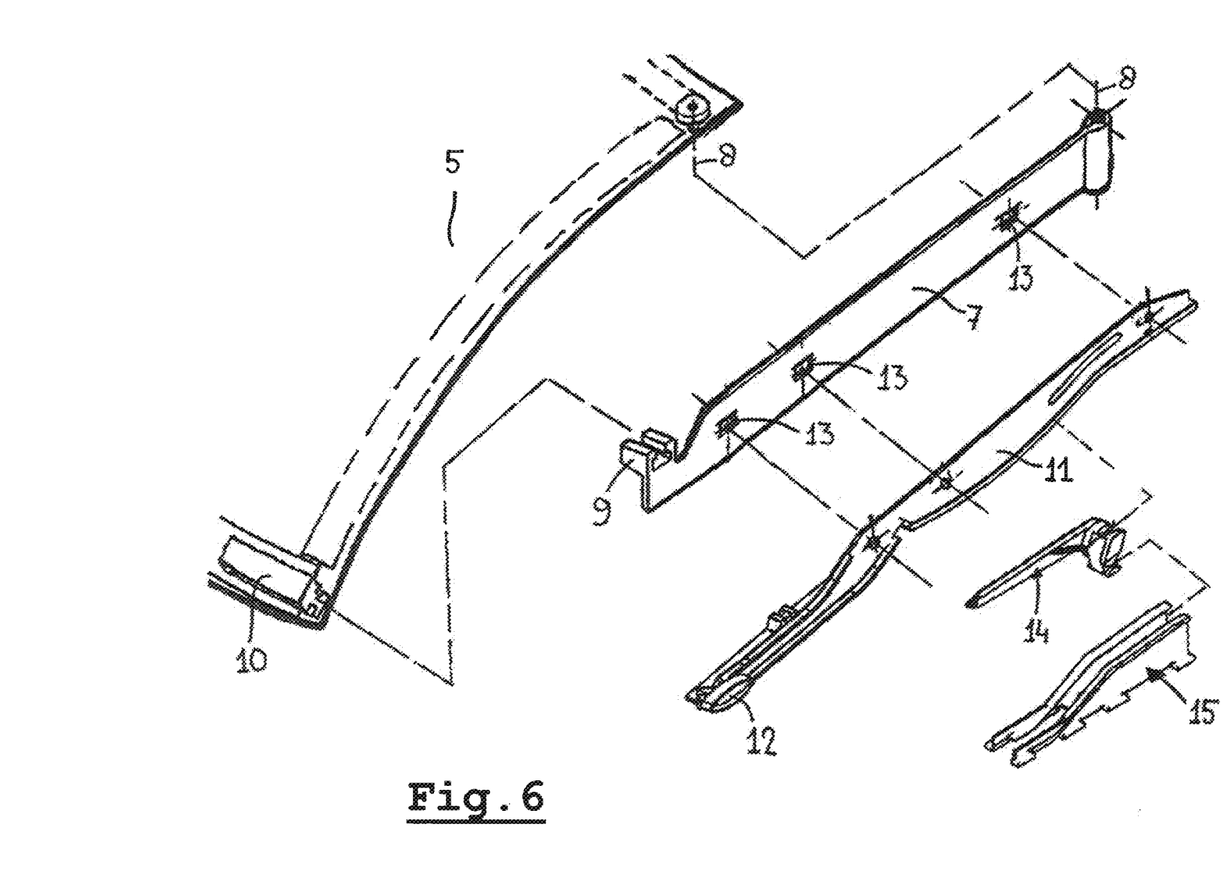
FIG. 6 in an exploded view shows details of a first embodiment.

FIG. 6 in an exploded view illustrates parts of an embodiment of the roof assembly for the open roof construction. A pivot arm 7 is shown with its pivot axis 8 at one end and at its other second end a guide member 9 for cooperation with a guide part 10 of the movable panel 5. In the present embodiment the guide member 9 and guide part 10 have mating profiles (but cooperating sections of these parts may be shaped in another manner too). The construction further comprises, among others, a curved part 11 having a construction which may be known per se and provided with a guide shoe 12 for cooperation with a stationary guide 6. This curved part 11 will be attached to the pivot arm 7 (e.g. by screws extending through holes 13 in the pivot arm 7). In a manner known per se the curved part 11 will cooperate with the specific guide 6 (through guide shoe 12) and with coupling members 14 and 15 which (depending on the type of panel 5 and the movement thereof) will cooperate with each other and with the stationary guides 6 in a manner known per se and not further elucidated here for offering the movable panel 5 the desired succession of movement (e.g. tilting, lifting and translating).

A biasing device, for example a spring element, (not illustrated) may be provided for biasing the pivotal motion of the pivot arms 7. Further a coupler (not illustrated) may be provided for coupling the pivotal motions of the pivot arms 7. Such features are shown and described in U.S. Published Patent Application 20110254323, which is incorporated herein in its entirety.

The pivotal motion of the arms 7 will occur in correspondence with the movement of the panel 3 as a result of the varying distance between the stationary curved guides 6. As a result the curved parts 11 may adopt a position in correspondence with said varying distance, as appears clearly when comparing the two situations illustrated in FIGS. 4 (movable panel 5 in a position for closing the roof opening 4) and 5 (movable panel 5 in a position for opening the roof opening 4).

The shape of said guide parts 10 is such that as a result of the cooperation between corresponding guide members 9 and guide parts 10 the movable panel 5 may be moved in a vertical and/or horizontal direction as a result of the rotation of the pivot arms 7 around the respective pivot axes 8. This will be elucidated hereinafter.

Again referring to FIGS. 4 and 5 the guide parts 10, as seen in a top plan view, are shaped to define a movement of the guide members 9 along a circle segment. However, it is conceivable that the guide parts 10 also define other movements of the guide members 9, e.g. along curved lines not defining circle segments such as but not limited to arcuate, portion of an ellipse, portion of a parabola etc. In this specific case the guide parts themselves define circle segment shaped parts. When the center of a circle pertaining to such a circle segment coincides with the respective pivot axis 8, the pivoting movement of the pivot arm 7 will not lead to a horizontal movement of the movable panel 5 but, in a manner to be described later, will be used to cause a vertical movement of the panel 5 only. If the center of a circle pertaining to such a circle segment however does not coincide with the respective pivot axis 8, the pivoting movement of the pivot arm 7 will lead to a horizontal movement of the movable panel 5 (but in such an event also additionally may be used to cause a vertical movement of the panel 5 too).

Figure 7:
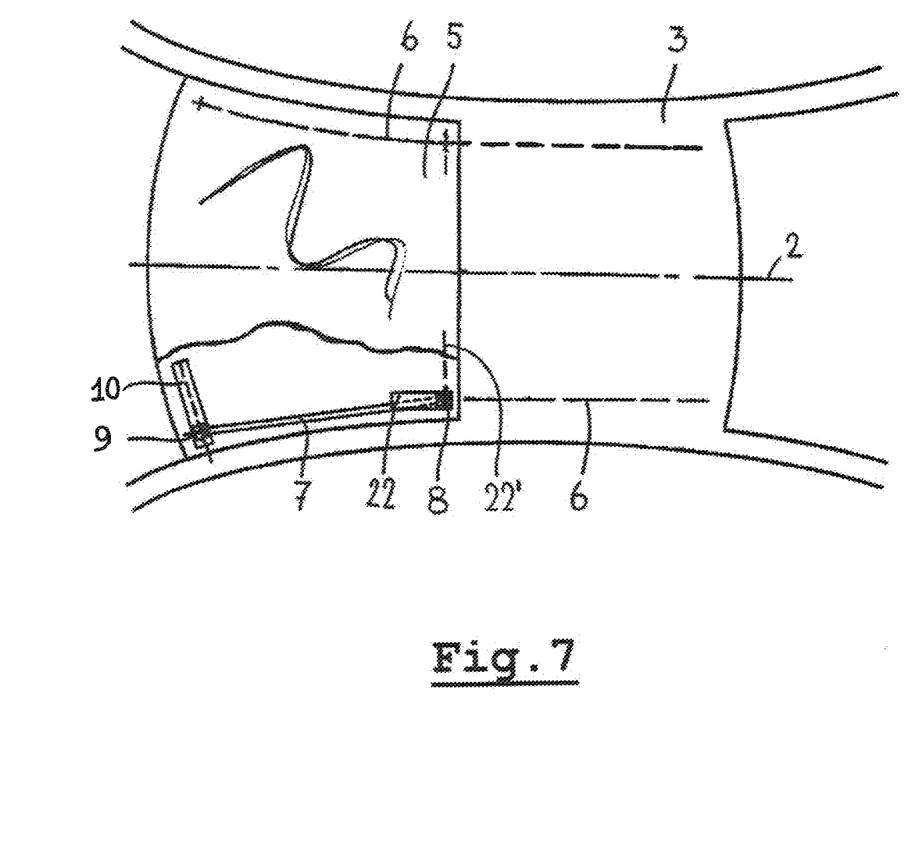
FIG. 7 shows a second embodiment in a schematic top plan view.

Referring to FIG. 7 an embodiment of the open roof construction is illustrated in which the guide parts 10, as seen in a top plan view, are shaped to define a movement of the guide members 9 along a substantially straight line. In such a case the pivoting movement of the pivot arm 7 will lead to a horizontal movement of the movable panel 5 (however again with the possibility of also causing a vertical movement of the panel 5).

Figure 8:
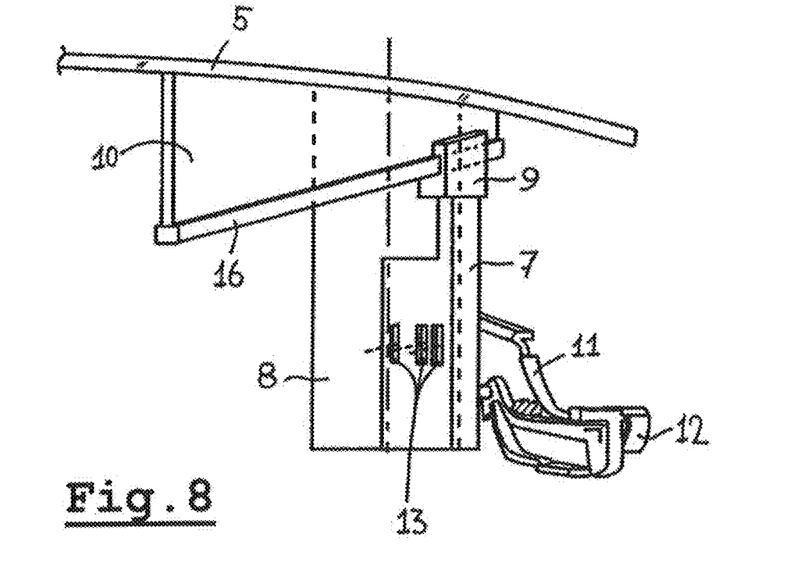
FIGS. 8 and 9 illustrate a frontal view of part of the embodiment of FIG. 7 in two different positions.
Figure 9:
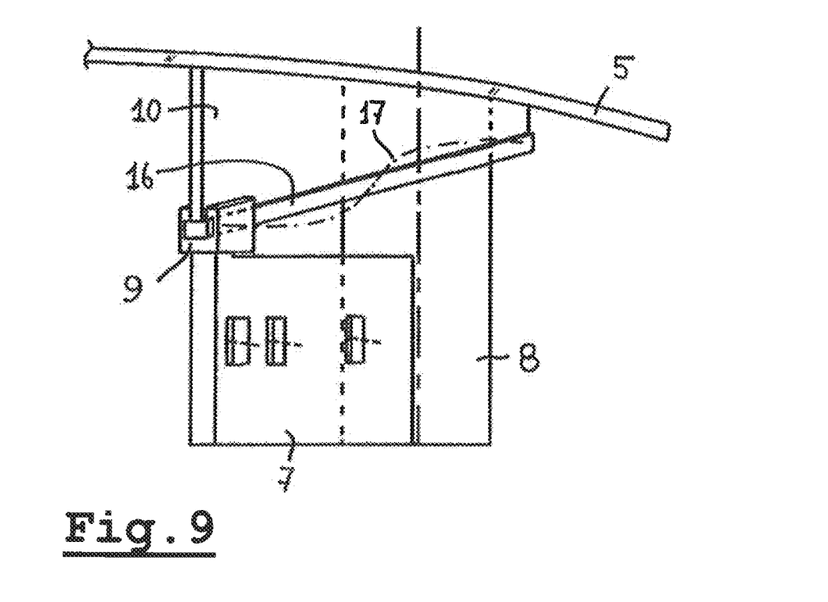

Referring to FIGS. 8 and 9 (which show a view of the left part of the construction in a frontal view of the vehicle, substantially in a direction according to the longitudinal direction) it can be seen that the guide part 10 defines a guide way 16 below the movable panel 5 determining the movement of the corresponding guide member 9, which guide way 16 has two opposite ends of which one end is located closer to the movable panel than the other end.

In FIG. 8 the guide member 9 is located close to the end of the guide way 16 closest to the movable panel 5 and the pivot arm 7 is in an outer position (substantially as shown in FIGS. 4 and 7). In FIG. 9 the pivot arm 7 has pivoted inwardly around pivot axis 8 and guide member has reached the opposite end of the guide way 16 further away from the movable panel 5 which, consequently, has been lifted.

In the illustrated embodiment the guide way 16 extends substantially with a constant inclination. However, it is conceivable too that the guide way 16 extends with a varying inclination, for example such that the inclination of the guide way 16 in the vicinity of its opposite ends is smaller than in a central region between the opposite ends, as represented schematically by dotted line 17 in FIG. 9.

Figure 11:
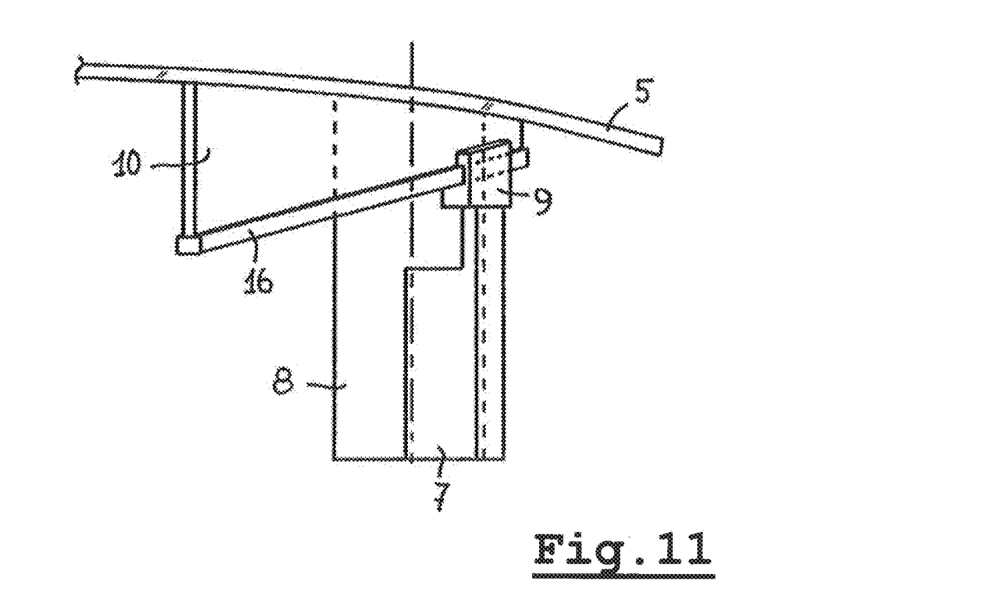

When a guide member 9 moves along a guide part 10, there is a risk that, especially depending on the shape of the guide part 10 (for example when it does not define a circle segment or other curve having its center at the pivot axis 8), a jamming may occur between the guide member 9 and guide part 10. Such a situation, for example, may occur when the open roof construction comprises a guide part 10 with substantially straight guide way 16 as illustrated again in FIG. 11. When the guide member 9 moves along said guide way 16, the relative orientation (angular disposition) between both parts will change.

Figure 10:
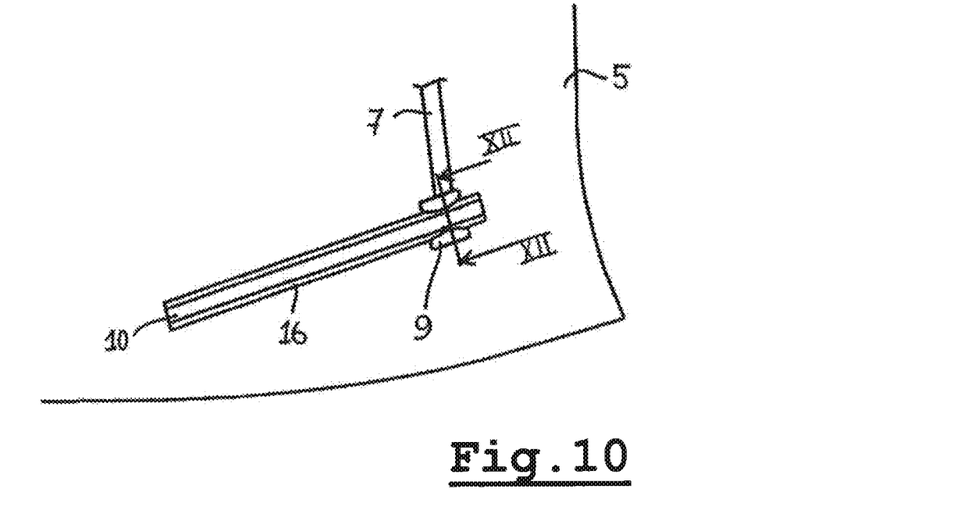
FIGS. 10 and 11 illustrate part of a third embodiment.
Figure 12:
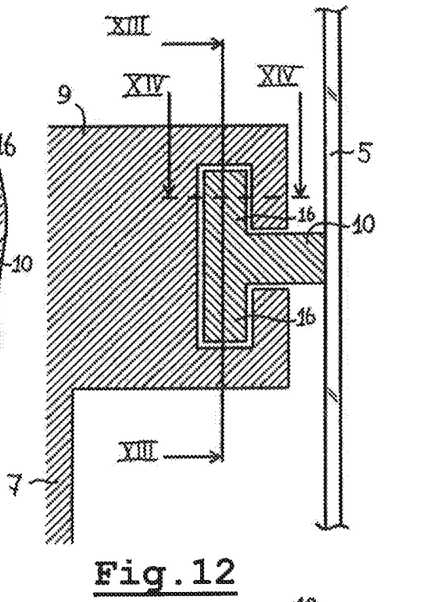
FIGS. 12-14 show sections of the embodiment according to FIGS. 10 and 11.
Figure 13:
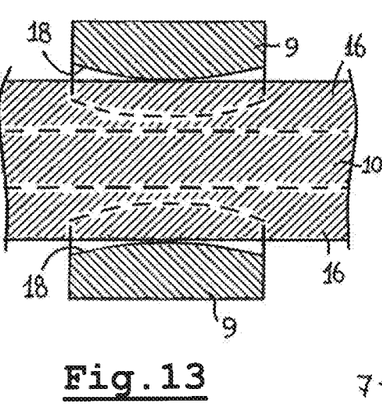
Figure 14:
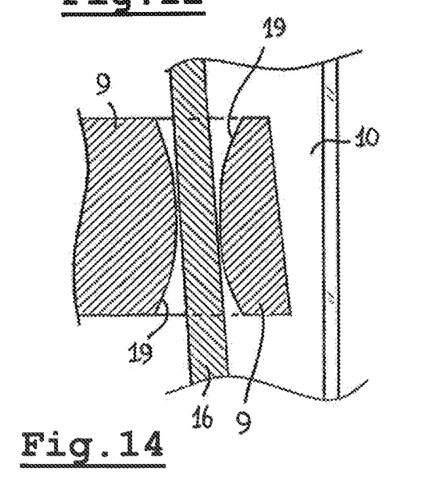

For coping with such a situation the cooperating parts of the guide member 9 and guide part 10 (guide way 16) are shaped in a manner to allow different angular dispositions between a guide member and respective guide part. This has been illustrated schematically in FIGS. 10 and 12-14 which show a top plan view and sections, respectively, of a guide member 9 with curved surfaces 18,19 and a guide part 10 with guide way 16. It is noted that FIG. 12 shows a section according to XII-XII in FIG. 10, FIG. 13 shows a section according to XIII-XIII in FIG. 12 and FIG. 14 shows a section according to XIV-XIV in FIG. 12.

Figure 15:
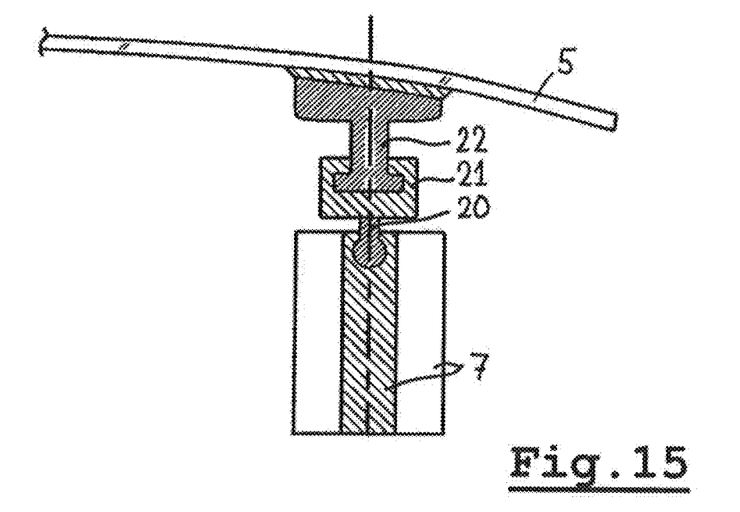
FIGS. 15 and 16 show part of a fourth embodiment.
Figure 16:
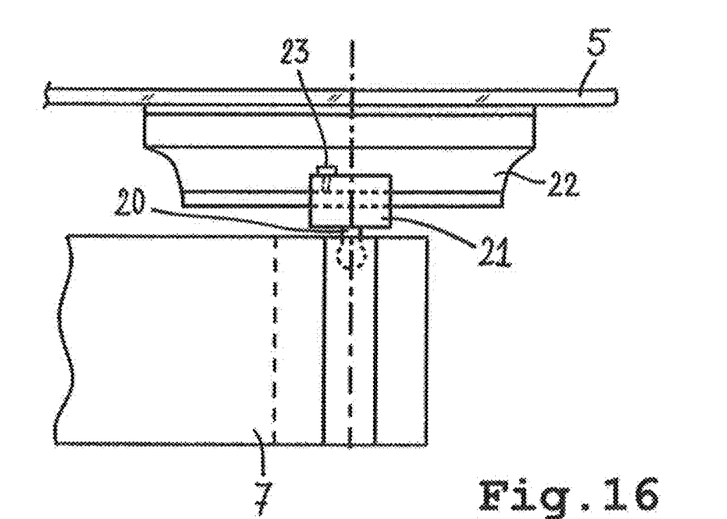

FIGS. 15 and 16 show an embodiment of the open roof construction wherein the pivot axis 20 is provided on a secondary guide member 21 which is guided by, and for movement along, a secondary guide part 22 attached to the movable panel 5. As a result the pivot axis 20 is connected to the movable panel in an adjustable manner. Means (for example a fixation screw 23) may be provided for immobilising the secondary guide member 21 relative to the secondary guide part 22, if needed. By the way, such an embodiment with movable pivot axis also is represented in FIG. 7.

It is noted that the movement of the pivot axis along such a secondary guide part may occur in different directions, such as longitudinally (as represented in the embodiment according to FIG. 7) or transversally (indicated schematically in FIG. 7 by dotted line 22'). The latter embodiment may be used, for example, when the pivot axis cooperates with a part of the open roof construction of which the transverse position changes (such as when the parts of the stationary guides 6 behind the roof opening 4 extend in a non parallel manner).

Figure 17:
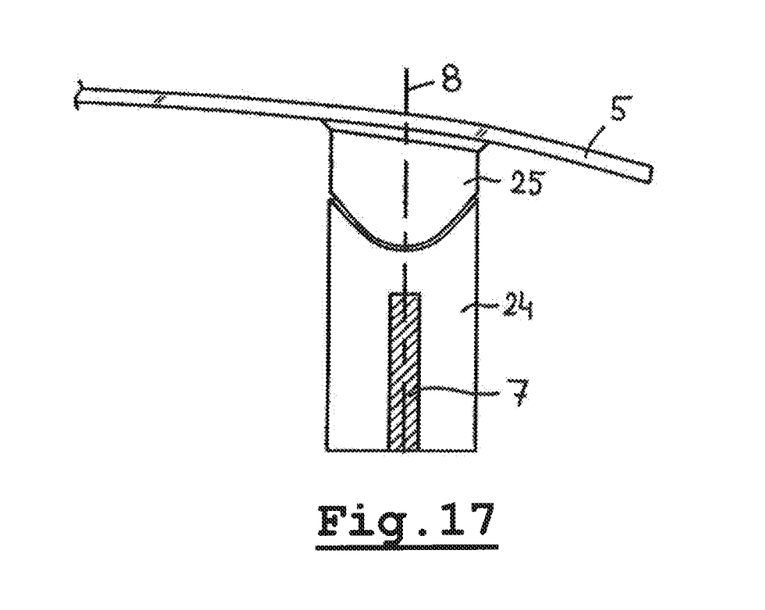
FIGS. 17-20 illustrate part of a fifth embodiment.
Figure 18:
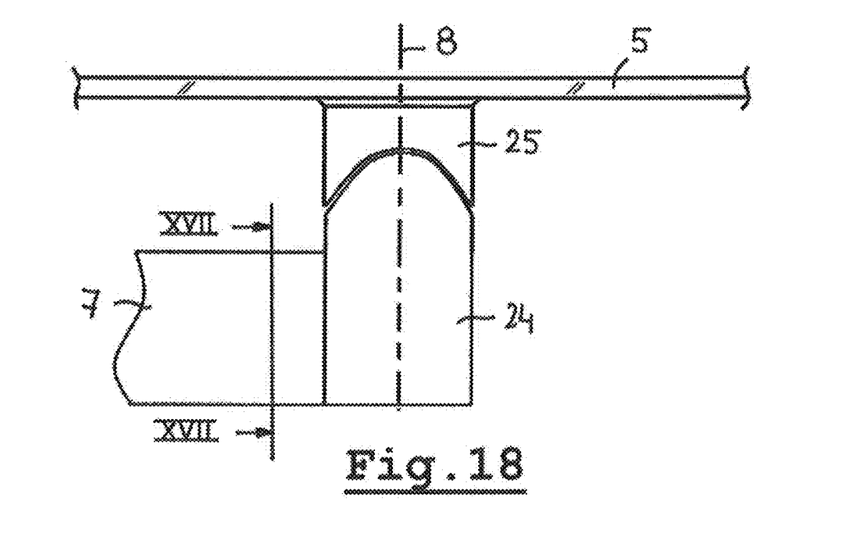
Figure 19:
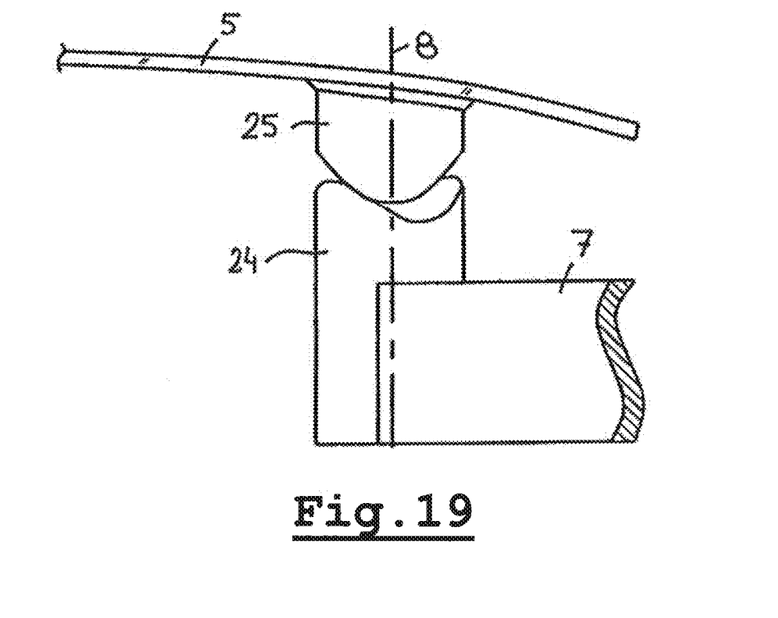
Figure 20:
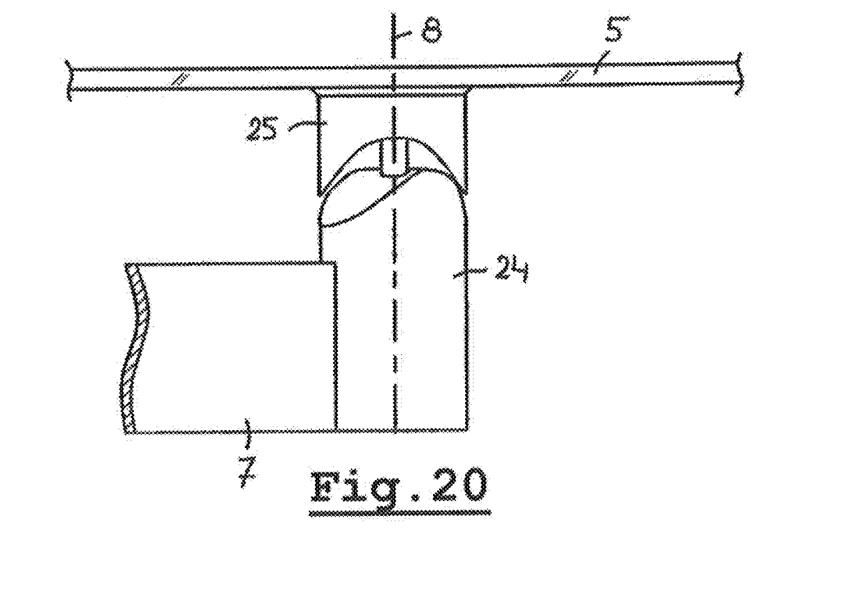

Aspects of the invention further may be materialised in an embodiment of the open roof construction in which cooperating parts of each pivot arm 7 and corresponding pivot axis 8 are shaped such that a relative rotation there between also causes a relative vertical movement there between. This has been illustrated in FIGS. 17-20. As shown in FIGS. 17 and 18 the pivot arm 7 and pivot axis 8 comprise and are defined, respectively, by cylindrical parts 24 and 25 with facing and cooperating frontal ends, wherein engaging curved surfaces are defined on said frontal ends. As a result, when the pivot arm 7 rotates around pivot axis 8 (as shown in FIGS. 19 and 20) the curved surfaces will slide along each other and the movable panel 5 will be lifted.

Figure 21:
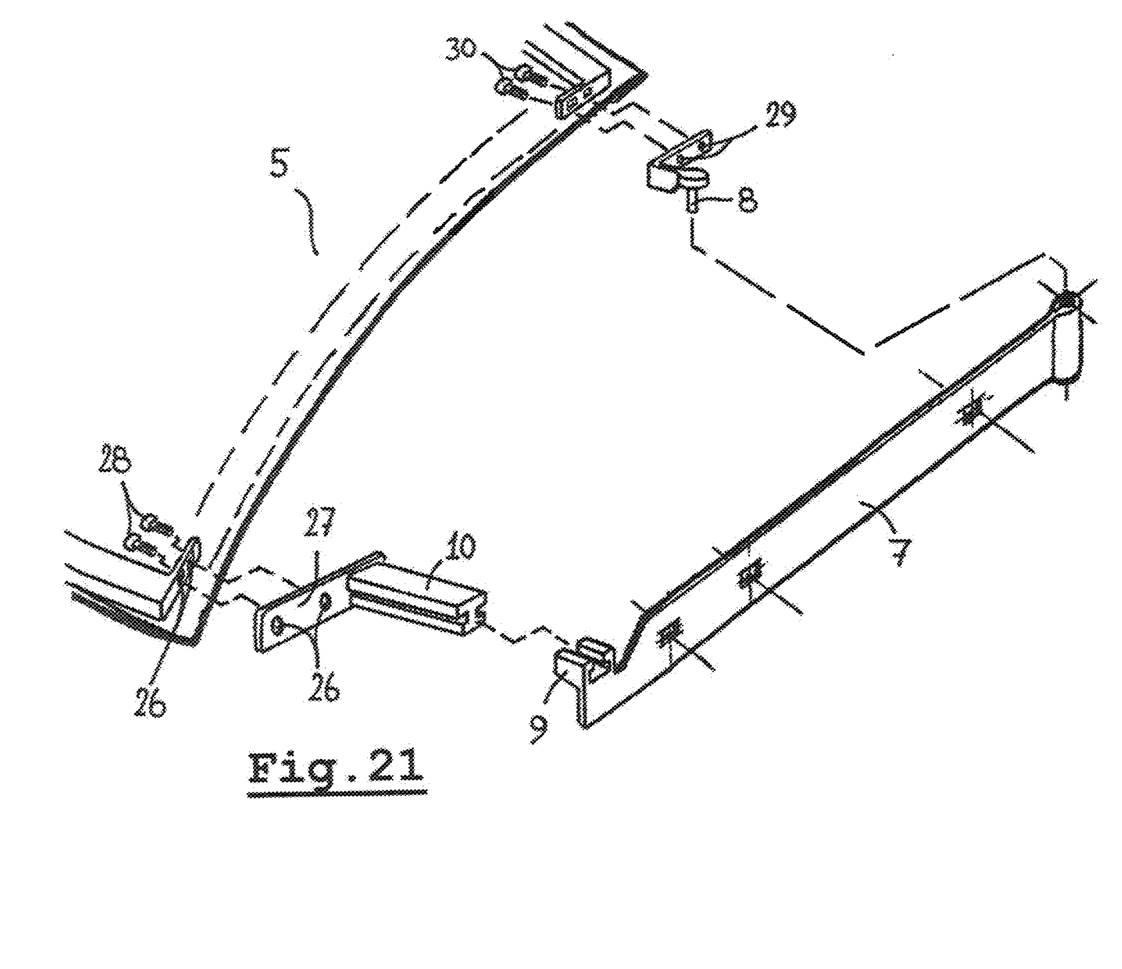
FIG. 21 shows details of a sixth embodiment.

Finally FIG. 21 shows an embodiment of the open roof construction according to which a guide part 10 is attached to the movable panel 5 in an adjustable manner, preferably adjustable in a longitudinal and/or vertical direction. As shown the adjustable attachment comprises oversized holes 26 in (a mounting plate 27 of) the guide part and/or in the movable panel 5 (or a mounting part attached thereto) for receiving attachment means, such as for example screws 28. Likewise the pivot axis 8 may be mounted in an adjustable manner by oversized holes 29 and screws 30.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims.

What is claimed is:

1. An open roof construction for a vehicle, comprising:
   a stationary roof part, having a roof opening provided therein;
   a panel which is movable—longitudinally on the vehicle between closed and open positions for closing and opening, respectively, said roof opening; and
   a moving mechanism for connecting the movable panel to the stationary roof and moving it with respect thereto, wherein the moving mechanism at least comprises:
   two stationary guides extending at least partly in a non-parallel manner along opposite longitudinal edges of the roof opening such that, as seen in a top plan view of the vehicle, a distance between the stationary guides varies at different lengthwise positions of the vehicle;
   two coupling members wherein each coupling member is configured for longitudinal movement on the corresponding stationary guide to effectuate movement of the panel longitudinally on the vehicle;

two pivot arms which each operate between a respective one of the coupling members and the movable panel and which each, at a first end, is movably attached to the movable panel with a substantially vertically extending pivot axis and which, closer to an opposite second end of the pivot arm, is guided by said respective one of the stationary guides, wherein further each pivot arm in the region of its second end is provided with at least one guide member, whereas the movable panel comprises at least two guide parts along which the respective guide members will move when the respective pivot arms, as a result of the cooperation between the stationary guides and said pivot arms, pivot around a respective pivot axis, wherein the shape of said guide parts is such that as a result of the cooperation between corresponding guide members and guide parts the movable panel is movable for an additional movement in a vertical and/or horizontal direction.

2. The open roof construction according to claim 1, wherein the guide parts, as seen in a top plan view, are shaped to define a movement of the guide members along a circle segment.

3. The open roof construction according to claim 2, wherein the center of the circle segment coincides with the pivot axis.

4. The open roof construction according to claim 1, wherein each guide part defines a guide way below the movable panel determining the movement of the corresponding guide member, which guide way has two opposite ends of which one end is located closer to the movable panel than the other end.

5. The open roof construction according to claim 4, wherein the guide way extends substantially with a constant inclination.

6. The open roof construction according to claim 4, wherein the guide way extends with a varying inclination.

7. The open roof construction according to claim 6, wherein the inclination of the guide way in the vicinity of its opposite ends is smaller than in a central region between the opposite ends.

8. A roof assembly for a vehicle, comprising:
a panel; and
a moving mechanism connected to the panel to move the panel between closed and open positions for closing and opening, respectively, a roof opening in a vehicle when the roof assembly is mounted in the vehicle, the moving mechanism comprising:
two stationary guides extending at least partly in a non-parallel manner such that, as seen in a top plan view of the vehicle, a distance between the stationary guides varies at different lengthwise positions along the guides;
two coupling members wherein each coupling member is configured for longitudinal movement on the corresponding stationary guide to effectuate movement of the panel longitudinally on the vehicle;
two pivot arms which each operate between a respective one of the coupling members and the movable panel and which each, at a first end, is movably attached to the movable panel with a substantially vertically extending pivot axis and which, closer to an opposite second end of the pivot arm, is guided by said respective one of the stationary guides, wherein further each pivot arm in the region of its second end is provided with at least one guide member, whereas the movable panel comprises at least two guide parts along which the respective guide members will move when the respective pivot arms, as a result of the cooperation between the stationary guides and said pivot arms, pivot around a respective pivot axis, wherein the shape of said guide parts is such that as a result of the cooperation between corresponding guide members and guide parts the movable panel is movable in an additional movement in a vertical and/or horizontal direction.

9. The open roof construction according to claim 8, wherein the additional movement in a vertical and/or horizontal direction comprises movement in a direction transverse to the longitudinal movement of the panel on the vehicle.

10. The open roof construction according to claim 1, wherein the additional movement in a vertical and/or horizontal direction comprises movement in a direction transverse to the longitudinal movement of the panel on the vehicle.

11. The open roof construction according to claim 1, wherein the guide parts, as seen in a top plan view, are shaped to define a movement of the guide members along a substantially straight line.

12. The open roof construction according to claim 1, wherein cooperating parts of each pivot arm and corresponding pivot axis are shaped such that a relative rotation there between also causes a relative vertical movement there between.

13. The open roof construction according to claim 12, wherein the pivot arm and pivot axis comprise cooperating curved surfaces.

14. The open roof construction according to claim 13, wherein the pivot arm and pivot axis comprise cylindrical parts with facing and cooperating frontal ends, wherein said curved surfaces are defined on said frontal ends.

15. The open roof construction according to claim 1, wherein the guide parts are attached to the movable panel in an adjustable manner, in a longitudinal and/or vertical direction.

16. The open roof construction according to claim 15, wherein the adjustable attachment comprises oversized holes in the guide parts and/or movable panel for receiving attachment means, such as for example screws.

17. The open roof construction according to claim 1, wherein the pivot axis is connected to the movable panel in an adjustable manner.

18. The open roof construction according to claim 17, wherein the pivot axis is provided on a secondary guide member which is guided by, and for movement along, a secondary guide part attached to the movable panel.

19. The open roof construction according to claim 1, wherein cooperating parts of the guide members and guide parts are shaped in a manner to allow different angular dispositions between a guide member and respective guide part.

20. The open roof construction according to claim 19, wherein said cooperating parts comprise curved surfaces.

* * * * *